United States Patent
Shida et al.

(10) Patent No.: US 6,223,797 B1
(45) Date of Patent: May 1, 2001

(54) PNEUMATIC TIRE WITH SPECIFIED RUBBER PROPERTIES

(75) Inventors: Zenichiro Shida; Masataka Koishi, both of Hiratsuka (JP)

(73) Assignee: The Yokohama Rubber Co., Tokyo (JP)

(*) Notice: Subject to any disclaimer, the term of this patent is extended or adjusted under 35 U.S.C. 154(b) by 0 days.

(21) Appl. No.: 09/237,843

(22) Filed: Jan. 27, 1999

(30) Foreign Application Priority Data

Jan. 29, 1998 (JP) .................................... 10-016303
Feb. 5, 1998 (JP) .................................... 10-024354

(51) Int. Cl.$^7$ ................ B60C 1/00; B60C 9/18; B60C 13/00; B60C 15/06
(52) U.S. Cl. ............ 152/532; 152/525; 152/537; 152/541; 152/546; 152/547
(58) Field of Search .................... 152/532, 537, 152/525, 546, 547, 541

(56) References Cited

U.S. PATENT DOCUMENTS 5,858,137 * 1/1999 Assaad et al. .............. 152/532 X

* cited by examiner

Primary Examiner—Adrienne C. Johnstone
(74) Attorney, Agent, or Firm—Arent Fox Kintner Plotkin & Kahn, PLLC

(57) ABSTRACT

Disclosed is a pneumatic tire which comprises a carcass layer provided between a pair of left and right bead sections, left and right side wall sections interpolated for connecting the pair of left and right bead sections with a tread section to be continuous, and at least two belt layers provided in an outer peripheral side of the carcass layer in the tread section, each of the belt layers being composed of a plurality of reinforcing cords coated with coating rubber. Storage elastic modulus E' of the coating rubber is set in a range of 15.0 to 40.0 MPa, and its loss tangent tan δ is set in a range of 0.1 to 0.25. Interlayer rubber is provided between end parts of the belt layers, the interlayer rubber being specifically set in each of both end parts thereof in a tire width direction, and elongation to break Eb of the interlayer rubber is set in a range of 400 to 700%. In another embodiment, at least a 30% area of a cross-sectional area of the bead apex positioned in the range of 20 to 35% of a tire section height SH is made of low tan δ rubber which is set in a range of 25 to 75% of tan δ of base bead apex rubber for a bead apex main body.

6 Claims, 4 Drawing Sheets

PNEUMATIC TIRE WITH SPECIFIED RUBBER PROPERTIES

BACKGROUND OF THE INVENTION

The present invention relates to a pneumatic tire for promoting higher fuel economy for a vehicle. More specifically, the invention relates to a pneumatic tire capable of reducing rolling resistance without damaging tire performance such as running performance on a wet road surface (wet performance) or wear resistance.

Generally, rubber of a large hysteresis loss is used for a cap tread of a tire so as to secure wear resistance and wet performance. On the other hand, for reducing tire rolling resistance so as to increase fuel economy, rubber of a small hysteresis loss must be used.

However, if rubber mixed for lower fuel costs, i.e., rubber of a small hysteresis loss, is used for reducing rolling resistance, a reduction inevitably occurs in tire performance such as wet performance or wear resistance. Thus, it has been considered that a characteristic of rolling resistance and a characteristic of wet performance or wear resistance are mutually imcompatible.

SUMMARY OF THE INVENTION

It is an object of the present invention to provide a pneumatic tire capable of reducing rolling resistance without damaging tire performance such as wet performance or wear resistance.

In order to achieve the foregoing object, provided is a pneumatic tire according to an aspect of the present invention which comprises a carcass layer provided between a pair of left and right bead sections; left and right side wall sections interpolated for connecting the pair of left and right bead sections with a tread section to be continues; and at least two belt layers provided in an outer peripheral side of the carcass layer in the tread section, each of the belt layers being composed of a plurality of reinforcing cords coated with coating rubber. This pneumatic tire is characterized in that storage elastic modulus E' of the coating rubber is set in a range of 15.0 to 40.0 MPa, its loss tangent tan $\delta$ is set in a range of 0.1 to 0.25, interlayer rubber is provided between end parts of the belt layers, the interlayer rubber being specifically set in each of both end parts thereof in a tire width direction, and elongation to break Eb of the interlayer rubber is set in a range of 400 to 700%.

We conducted earnest studies with a view to suppressing deformation of the tread section. As a result, we discovered that an increase of coating rubber storage elastic modulus E' for the belt layer in the foregoing range and suppression of deformation of the belt layer or the tread section adjacent to the belt layer were effective for reducing rolling resistance. Thus, it is not necessary to use, for a cap tread, rubber of a small hysteresis loss mixed for lower fuel costs. Therefore, rolling resistance can be reduced without damaging tire performance such as wet performance or wear resistance.

Even if coating rubber storage elastic modulus E' for the belt layer is increased, an effect of reducing rolling resistance will be insufficient if its loss tangent tan $\delta$ is large. Accordingly, a coating rubber loss tangent tan $\delta$ for the belt layer must be set small in the foregoing range.

If coating rubber storage elastic modulus E' for the belt layer is large, an interlayer movement between the end parts of the belt layers will be restricted and thus a failure will easily occur in this portion. Accordingly, elongation to break Eb of the interlayer rubber provided between the end parts of the belt layers must be set large in the foregoing range, and fatigue resistance to interlayer shearing deformation in the end parts of the belt layers must be increased.

In addition, storage elastic modulus E' of side wall rubber for each of the side wall sections should preferably be set small in a range of 2.0 to 3.0 MPa. By setting small storage elastic modulus E' of the side wall rubber, deformation easily occurs in the side wall section which gives only a small effect on rolling resistance, and thus a synergistic effect of suppressing deformation of the tread section can be provided. For providing an effect of sufficiently reducing rolling resistance, a loss tangent tan $\delta$ of the side wall rubber should preferably be set small in a range of 0.07 to 0.15.

Furthermore, a height of a bead apex arranged in each of the bead sections should preferably be set in a range of 10 to 35% of a tire section height SH. By setting low a height of the bead apex, deformation easily occurs in the bead section, and thus a synergistic effect of suppressing deformation of the tread section can be provided. For providing an effect of sufficiently reducing rolling resistance, a loss tangent tan $\delta$ of bead apex rubber for the bead apex must be set small in a range of 0.1 to 0.25.

In order to achieve the foregoing object, provided is a pneumatic tire according to another aspect of the present invention which comprises a carcass layer provided between a pair of left and right bead sections, each of both end parts of the carcass layer in a tire width direction being turned up around a bead core from the inside of a tire to its outside; and a bead apex arranged in an outer peripheral side of the bead core. This pneumatic tire is characterized in that at least a 30% area of a section area of the bead apex positioned in a range of 20 to 35% of a tire section height SH is made of low tan $\delta$ rubber which is set in a range of 25 to 75% of tan $\delta$ of base bead apex rubber for a bead apex main body.

We conducted earnest studies with a view to effectively suppressing energy losses concentrated in the bead sections. As a result, we discovered that the occurrence of energy losses in each of the bead sections concentrated in an area from an upper part to a halfway part of the bead apex, especially in its outside, positioned in the range of 20 to 35% of the tire section height SH. Then, we discovered that by selectively arranging low tan $\delta$ rubber only in a portion of the bead section where the occurrence of energy losses concentrated, it was possible to effectively suppress energy losses concentrated in the bead section and thereby reduce rolling resistance. Therefore, since it is not necessary to use, for a cap tread, rubber of a small hysteresis loss mixed for lower fuel costs, rolling resistance can be reduced without damaging tire performance such as wet performance or wear resistance. Moreover, even if handling stability is improved by using rubber of high hardness and high tan $\delta$ for base bead apex rubber for a bead apex main body, an increase of rolling resistance will be prevented by locally arranging low tan $\delta$ rubber as described above. Accordingly, reduced rolling resistance and handling stability can be provided simultaneously on a high order.

In addition, a turned-up edge of the carcass layer should preferably be arranged to be outside the range of 20 to 35% of the tire section height SH. By arranging the wound-up end of the carcass layer to be outside the range where the occurrence of energy losses concentrates, durability can be increased.

In the present invention, storage elastic modulus E' was measured by using a visco-elastic spectrometer (made by Iwamoto Works) under the following conditions: frequency 20 Hz; initial strain 10%; dynamic strain ±2%; and temperature 60° C. A loss tangent tan δ was measured by using the visco-elastic spectrometer (made by Iwamoto Works) under the following conditions: frequency 20 Hz; initial strain 10%; dynamic strain ±2%; and temperature 60° C.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Figure 1:
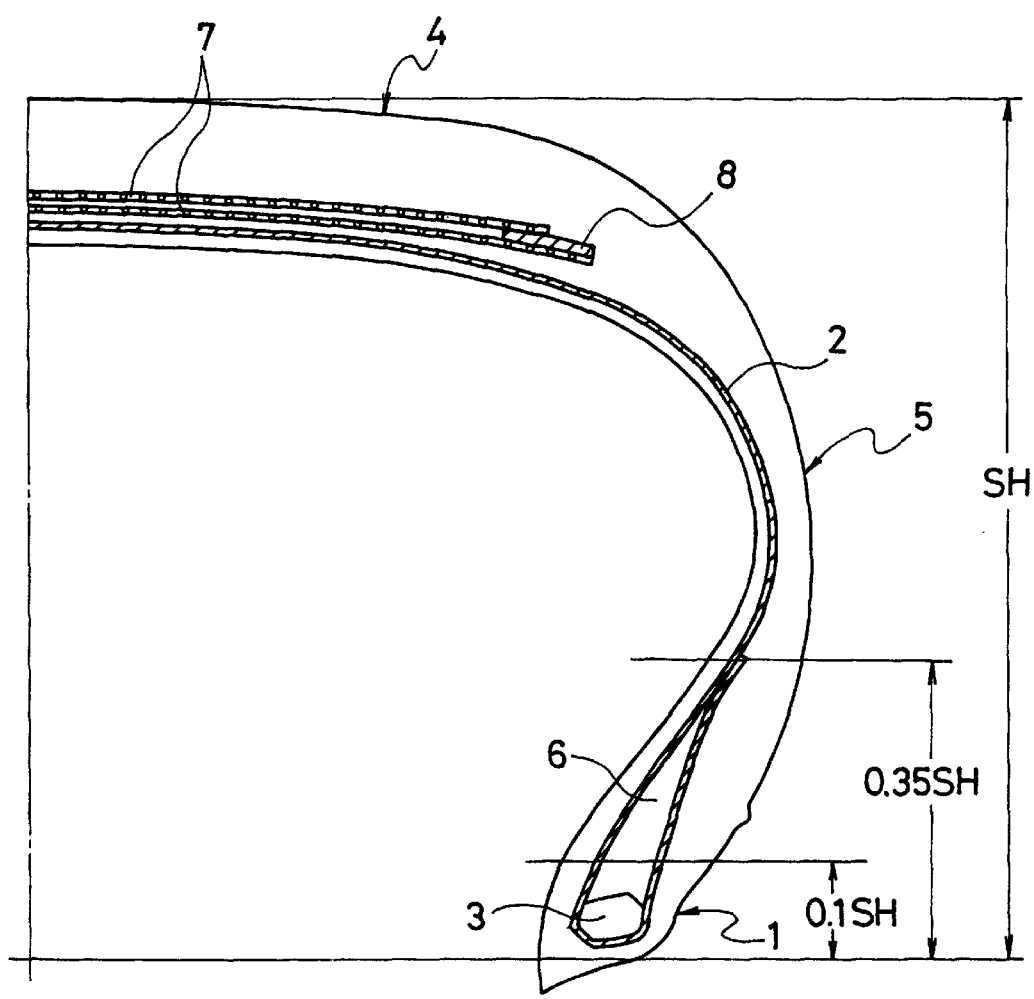
FIG. 1 is a meridian half sectional view showing a pneumatic tire of a first embodiment of the present invention.

Referring to FIG. 1, shown is a pneumatic tire of a first embodiment of the present invention. In the drawing, a carcass layer 2 composed of a plurality of reinforcing cords arranged in a radial direction is provided between a pair of left and right bead sections 1 and 1. Each of both end parts of the carcass layer 2 in a tire width direction is turned up around a bead core 3 from the inside of a tire to its outside. The pair of left and right bead sections 1 and 1 and a tread section 4 are connected to each other by interpolating left and right side wall sections 5 and 5. A bead apex 6 is arranged in an outer peripheral side of the bead core 3. This bead apex 6 is enveloped in the carcass layer 2.

In an outer peripheral side of the carcass layer 2 in the tread section 4, at least provided are two belt layers 7 and 7, each of which is composed of a plurality of reinforcing cords coated with coating rubber. These belt layers 7 and 7 are arranged such that the reinforcing cords can be inclined relative to a tire circumferential direction and cross each other between the layers. Inserted between the belt layers 7 and 7 is interlayer rubber 8 which is specifically set in each of both end parts thereof in the tire width direction.

Coating rubber storage elastic modulus E' for each belt layer 7 should be set in a range of 15.0 to 40.0 MPa, or more preferably in a range of 20.0 to 30.0 MPa. If this coating rubber storage elastic modulus E' is lower than 15.0 MPa, an effect of reducing rolling resistance cannot be provided. Conversely, if storage elastic modulus E' exceeds 40.0 MPa, durability will be reduced. A coating rubber loss tangent tan δ for each belt layer 7 should be set in a range of 0.1 to 0.25, or more preferably in a range of 0.1 to 0.2. If this coating rubber loss tangent tan δ exceeds 0.25, rolling resistance will be increased. On the other hand, it is technically difficult to set a loss tangent tan δ to be lower than 0.1.

With reference to belt coating rubber, the one which has high adhesiveness with cords or the like while maintaining strong strength and low heat generation should be preferable. Accordingly, natural rubber is mainly used for belt coating rubber. Preferably, carbon black should be a grade of HAF class or lower, and its mixing amount should be 40 to 70 parts by weight per 100 parts by weight of rubber. Also preferably, carbon black should contain auxiliary adhesive such as naphthenic acid cobalt for increasing adhesiveness. No special limitation is placed on other agents to be mixed, and these agents can be mixed as occasion demands for obtaining necessary material properties.

Elongation to break Eb of the interlayer rubber 8 provided between the end parts of the belt layers 7 should be set in a range of 400 to 700%, or more preferably in a range of 450 to 700%. If this elongation to break Eb of the interlayer rubber 8 is lower than 400%, durability will be reduced. On the other hand, it is technically difficult to set elongation to break Eb to be higher than 700%.

Preferred for interlayer rubber provided between the belt end parts is one which has high adhesiveness with another tire rubber while maintaining strong strength and low heat generation. Accordingly, natural rubber is mainly used for interlayer rubber. Preferably, carbon black should be a grade of HAF class or lower, and its mixing amount should be 40 to 70 parts by weight per 100 parts by weight of rubber. No special limitation is placed on other agents to be mixed, and these agents can be mixed as occasion demands for obtaining necessary material properties.

As described above, by setting coating rubber storage elastic modulus E' for each belt layer 7 to be large, its loss tangent tan δ to be small and elongation to break Eb for the interlayer rubber 8 provided between the end parts of the belt layers 7 to be large respectively in the foregoing ranges, deformation of the belt layers 7 and the tread section 4 adjacent to the belt layers 7 can be suppressed without generating any failures in both end parts of each of the belt layers 7. Accordingly, rolling resistance can be effectively reduced. Also, since it is not necessary to use, for the cap tread, rubber of a small hysteresis loss which is mixed for lower fuel costs, damage to tire performance such as wet performance or wear resistance can be prevented.

In the foregoing pneumatic tire, storage elastic modulus E' of side wall rubber for each side wall section 5 should be set in a range of 2.0 to 3.0 MPa, or more preferably in a range of 2.0 to 2.5 MPa. If this storage elastic modulus E' of side wall rubber is lower than 2.0 MPa, rigidity of the side wall section 5 will be excessively reduced, which will lead to a reduction in handling stability. Conversely, if storage elastic modulus E' of side wall rubber exceeds 3.0 MPa, no synergistic effects of suppressing deformation of the tread section 4 will be provided, nor will rolling resistance be reduced. For providing an effect of sufficiently reducing rolling resistance, a loss tangent tan δ of side wall rubber should be set in a range of 0.07 to 0.15, or more preferably in a range of 0.07 to 0.13. Instead of setting a side wall rubber modulus to be small as described above, or simultaneously when a side wall rubber modulus is set to be small, a gauge of the side wall section 5 may be set to be thin. If a gauge of the side wall section 5 is set to be thin, a hysteresis volume of the side wall section 5 will be reduced. Accordingly, deformation of the tread section 4 will be suppressed more effectively.

Preferred side wall rubber for securing cutting resistance is one which maintains high strength, especially high elongation to break and strength, and low heat generation. Accordingly, side wall rubber should preferably contain natural rubber of 20 to 70 parts by weight, and cis BR of 80 to 30 parts by weight. Preferably, carbon black should be a grade of HAF class or lower, and its mixing amount should be 40 to 80 parts by weight per 100 parts by weight of rubber. For securing ozone resistance, antioxidants or wax should preferably be contained. No special limitation is placed on other agents to be mixed, and these agents can be mixed as occasion demands for obtaining necessary material properties.

A height of the bead apex 6 arranged in each bead section 1 should preferably be set, from a bead base, in a range of 10 to 35% (0.1 SH to 0.35 SH) of a tire section height SH. If a height of the bead apex 6 is lower than 10% of a tire section height SH, rigidity of the bead section 1 will be excessively reduced, which will lead to a reduction in handling stability. Conversely, if a height of the bead apex 6 exceeds 35%, no synergistic effects of reducing deformation of the tread section 4 will be provided. Consequently, rolling resistance will not be reduced. For providing an effect of sufficiently reducing rolling resistance, a loss tangent tan $\delta$ of bead apex rubber for the bead apex 6 should preferably be set in a range of 0.1 to 0.2, or more preferably in a range of 0.1 to 0.18.

Preferred for bead apex rubber is one which has high adhesiveness with another tire rubber while maintaining appropriate hardness and strength in all temperature areas where the tire is used. Accordingly, for bead apex rubber, natural rubber blended with SBR should be mainly used. For obtaining appropriate hardness, one containing a large quantity of resins in addition to reinforcing agents such as carbon black should preferably be used. No special limitation is placed on other agents to be mixed, and these agents can be mixed as occasion demands for obtaining necessary material properties.

Figure 2:
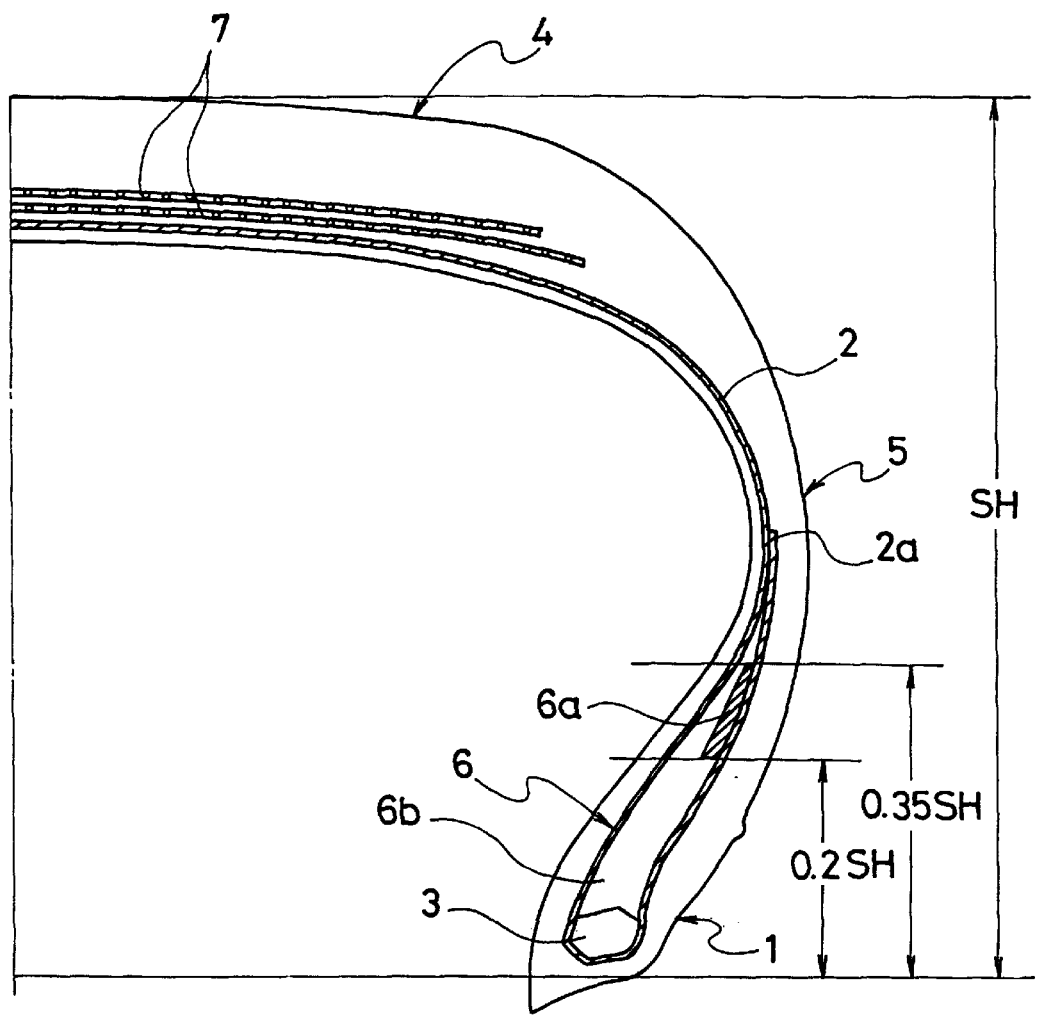
FIG. 2 is a meridian half sectional view showing a pneumatic tire of a second embodiment of the present invention.

Referring to FIG. 2, shown is a pneumatic tire of a second embodiment of the present invention. In the drawing, a carcass layer 2 composed of a plurality of reinforcing cords arranged in a radial direction is provided between a pair of left and right bead sections 1 and 1. Each of both end parts of the carcass layer 2 in a tire width direction is turned up around a bead core 3 from the inside of a tire to its outside. The pair of left and right bead sections 1 and 1 and a tread section 4 are connected to each other by interpolating left and right side wall sections 5 and 5. A bead apex 6 is arranged in an outer peripheral side of the bead core 3. This bead apex 6 is enveloped in the carcass layer 2. In an outer peripheral side of the carcass layer 2 in the tread section 4, at least provided are two belt layers 7 and 7, each of which is composed of a plurality of reinforcing cords coated with coating rubber. These belt layers 7 and 7 are arranged such that the reinforcing cords can be inclined relative to a tire circumferential direction and cross each other between the layers.

In the foregoing pneumatic tire, a part of the bead apex 6 positioned in a range of 20 to 35% of a tire section height SH is made of low tan $\delta$ rubber. This is because even if a part outside the foregoing range is set to be low tan $\delta$, only a small effect of reducing rolling resistance will be provided. In the foregoing range, it is necessary to set at least a 30% area 6a of a section area of the bead apex 6 to be low tan $\delta$. If the area 6a set to be low tan $\delta$ is smaller than 30% of the bead apex section area in the foregoing range, an effect of reducing rolling resistance will be insufficient.

When the bead apex section area in the foregoing range is partially set to be low tan $\delta$, low tan $\delta$ rubber should preferably be arranged in the outside of the bead apex 6, especially halfway up the bead apex 6 and in its outside. This is because even if low tan $\delta$ rubber is arranged in the inside of the bead apex 6, an effect of reducing rolling resistance will be small. For substantially eliminating an effect of low tan $\delta$ on handling stability, a section area of the area 6a set to be low tan $\delta$ should preferably be 70% or lower of the bead apex section area in the foregoing range.

Low tan $\delta$ rubber for the area 6a should be set in a range of 25 to 70% of tan $\delta$ of base bead apex rubber for a bead apex main body 6b. If low tan $\delta$ rubber exceeds 75% of tan $\delta$ of the base bead apex rubber, an effect of reducing rolling resistance will be insufficient. On the other hand, it is technically difficult to set low tan $\delta$ rubber blended with practical rubber to be 25% or lower of tan $\delta$ of the base bead apex rubber. Tan $\delta$ of the base bead apex rubber can be appropriately set according to a requested tire characteristic. But for providing good handling stability in addition to an effect of reducing rolling resistance, tan $\delta$ of the base bead apex rubber should preferably be set in a range of 0.15 to 0.3.

Preferred for base bead apex rubber is one which has high adhesiveness with another tire rubber while maintaining appropriate hardness and strength in all temperature areas where the tire is used. Accordingly, for base bead apex rubber, natural rubber blended with SBR should preferably be used. For obtaining appropriate hardness, one containing a large quantity of resins in addition to reinforcing agents such as carbon black should preferably be used. No special limitation is placed on other agents to be mixed, and these agents can be mixed as occasion demands for obtaining necessary material properties.

Preferred for low tan $\delta$ rubber is one which has high adhesiveness with another tire rubber while maintaining low heat generation and appropriate hardness and strength in all temperature areas where the tire is used. Accordingly, for low tan $\delta$ rubber, natural rubber blended with SBR should preferably be used. For obtaining appropriate hardness, one containing a large quantity of resins in addition to reinforcing agents such as carbon black should preferably be used. No special limitation is placed on other agents to be mixed, and these agents can be mixed as occasion demands for obtaining necessary material properties.

As described above, at least 30% area 6a of a section area of the bead apex 6 positioned in the range of 20 to 35% of the tire section height SH is made of low tan $\delta$ rubber which is set in the range of 25 to 75% of tan $\delta$ of the base bead apex rubber. Accordingly, energy losses concentrated in the bead section 1 can be suppressed. Therefore, rolling resistance can be effectively reduced, and reduced rolling resistance and handling stability can be provided simultaneously on a high order. Moreover, since it is not necessary to use, for a cap tread, rubber of a small hysteresis loss mixed for lower fuel costs, tire performance such as wet performance or wear resistance will not be damaged.

In the foregoing pneumatic tire, a turned-up edge 2a of the carcass layer 2 should preferably be arranged so as to be outside a range of 20 to 35% of the tire section height SH. If this turned-up edge 2a of the carcass layer 2 is in the foregoing range, durability may be reduced.

Figure 3:
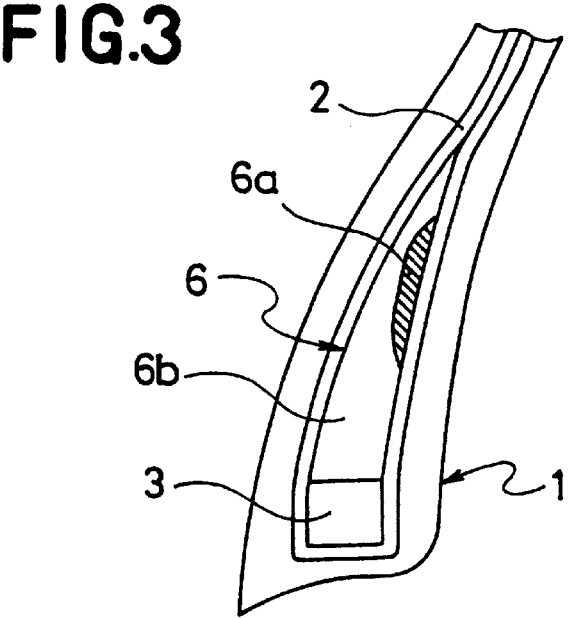
FIG. 3 is a sectional view showing a bead section in the pneumatic tire of the second embodiment of the present invention.
Figure 4:
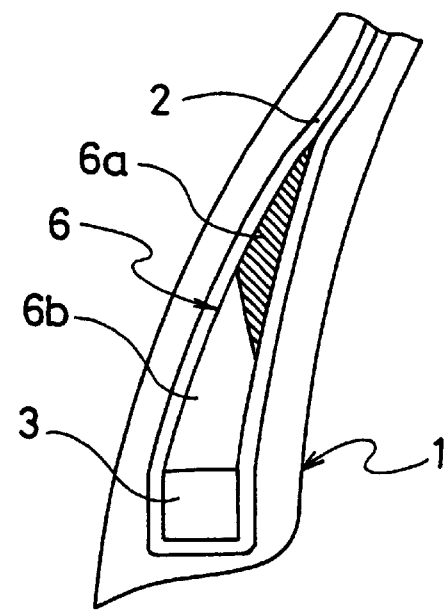
FIG. 4 is a sectional view showing a modified example of a bead section in the pneumatic tire of the second embodiment of the present invention.
Figure 5:
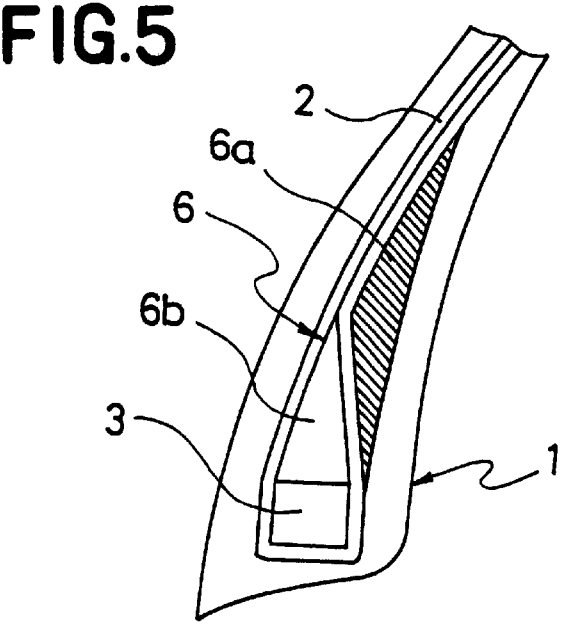
FIG. 5 is a sectional view showing another modified example of a bead section in the pneumatic tire of the second embodiment of the present invention.

According to the present invention, no special limitation is placed on section shapes of the low tan $\delta$ area 6a of the bead apex 6 and the bead apex main body 6b. The area 6a set to be low tan $\delta$ may be arranged in the outside of a part halfway up the bead apex 6 as shown in FIG. 3. Alternatively, the area 6a set to be low tan $\delta$ may be arranged in the outside of an upper part of the bead apex 6 as shown in FIG. 4. Otherwise, the area 6a set to be low tan $\delta$ may be provided separately from the bead apex main body 6b and arranged in the outside of the carcass layer 2 as shown in FIG. 5.

Figure 6:
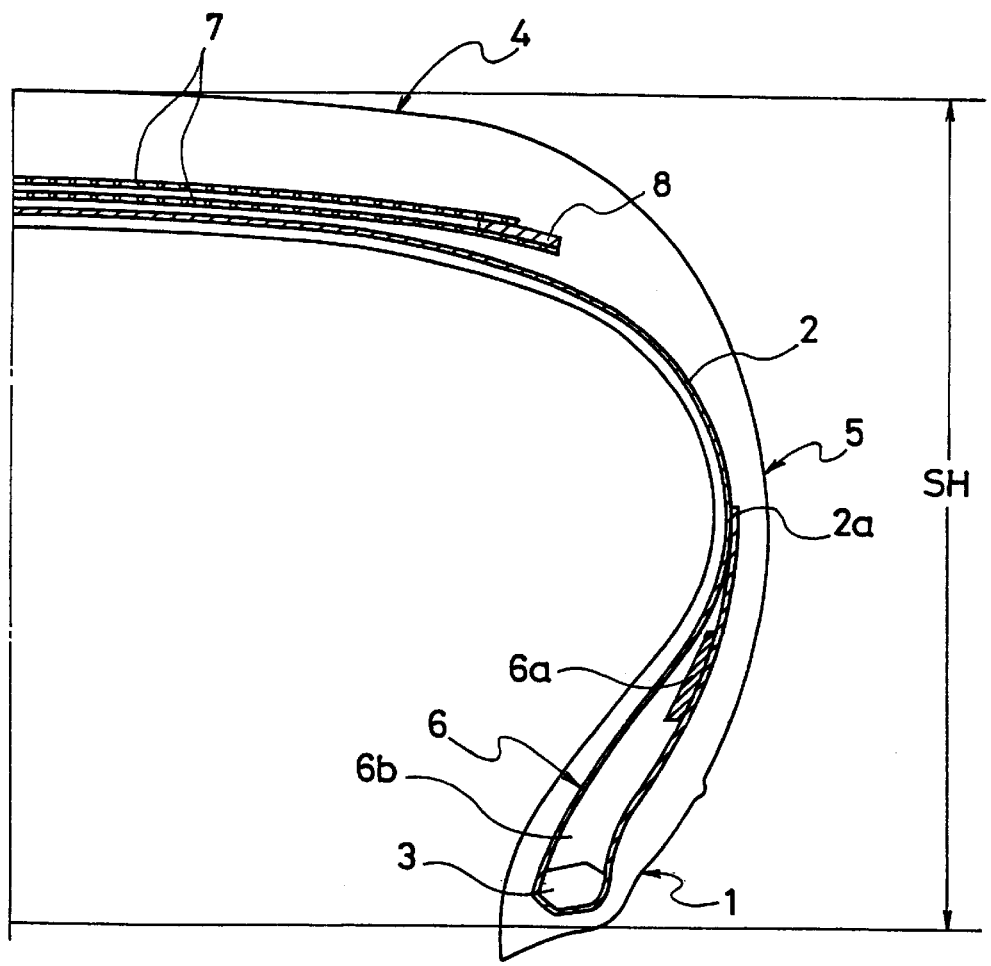
FIG. 6 is a meridian half sectional view showing a pneumatic tire of a third embodiment of the present invention.

Referring to FIG. 6, shown is a pneumatic tire of a third embodiment of the present invention. This pneumatic tire has characteristics of both first and second embodiments. As shown in FIG. 6, by simultaneously using structures of the first and second embodiments for one tire, rolling resistance can be reduced much more effectively.

EXAMPLE 1

We manufactured a conventional tire 1, comparison tires 1 to 3 and tires 1 to 3 of the present invention. A tire size was 185/65R14 for each, and a tire structure shown in FIG. 1 was employed for each. But storage elastic modulus E' of belt coating rubber, loss tangents tan δ of belt coating rubber, elongation to break Eb of belt end part interlayer rubber, storage elastic modulus E' of side wall rubber, loss tangents tan δ of side wall rubber, bead apex heights and loss tangents tan δ of bead apex rubber were different among the tires. Each of the bead apex heights is a ratio with respect to a tire section height SH. A tire section height SH is 121 mm.

For the foregoing test tires, we evaluated rolling resistance and durability by using a testing method described below, and results of evaluation are shown in Table 1.

Rolling resistance:

Each test tire was fixed to a wheel having a rim size of 14×5·½ JJ, and loaded in a drum tester by setting an air pressure to be 200 kPa. An ambient temperature was controlled to be 23±2° C., an outer peripheral surface of a steel drum having a flat surface and a diameter of 1707 mm was run at a speed of 80 km, and rolling resistance in this case was measured. The results of evaluation are shown by indexes with an index for the conventional tire set as 100. As this index value is smaller, rolling resistance is smaller.

Durability

Each test tire was fixed to a wheel having a rim size of 14×5·½ JJ, and loaded in a drum tester by setting an air pressure to be 240 kPa. An ambient temperature was controlled to be 38±3° C., and an outer peripheral surface of a steel drum having a flat surface and a diameter of 1707 mm was run at a speed of 81 km. In this case, an initial load was 4.57 kN. A load was increased by 0.68 kN for every 2 hours until a load 7.28 kN was reached. Thereafter, a load was increased by 0.68 kN for every 4 hours until a load 14.0 kN was reached. Then, testing was finished after 4-hour running at the load of 14.0 kN. A case showing a failure after the end of this testing is indicated by a mark "×", a case showing no failures is indicated by a mark "○" and a case showing no symptoms of failures is indicated by a mark "⊙".

TABLE 1

|  | Conventional tire 1 | Comparison tire 1 | Tire 1 of the invention | Comparison tire 2 | Tire 2 of the invention | Comparison tire 3 | Tire 3 of the invention |
| --- | --- | --- | --- | --- | --- | --- | --- |
| Tire structure |  |  |  |  |  |  |  |
| Mixing of belt coating rubber | Mixing example $A_1$ | Mixing example $A_2$ | Mixing example $A_2$ | Mixing example $A_1$ | Mixing example $A_2$ | Mixing example $A_1$ | Mixing example $A_2$ |
| Storage elastic modulus E' of belt coating rubber (MPa) | 12.0 | 15.0 | 15.0 | 12.0 | 15.0 | 12.0 | 15.0 |
| Loss tangent tan δ | 0.2 | 0.22 | 0.22 | 0.2 | 0.22 | 0.2 | 0.22 |
| Mixing of belt end part interlayer rubber | Mixing example $A_1$ | Mixing example $A_1$ | Mixing example $A_3$ | Mixing example $A_1$ | Mixing example $A_3$ | Mixing example $A_1$ | Mixing example $A_3$ |
| Elongation to break Eb of belt end part interlayer rubber (%) | 300 | 300 | 400 | 300 | 400 | 300 | 400 |
| Mixing of side wall rubber | Mixing example $B_1$ | Mixing example $B_1$ | Mixing example $B_1$ | Mixing example $B_2$ | Mixing example $B_2$ | Mixing example $B_1$ | Mixing example $B_2$ |
| Storage elastic modulus E' of side wall rubber (MPa) | 3.5 | 3.5 | 3.5 | 3.0 | 3.0 | 3.5 | 3.0 |
| Loss tangent tan δ of side wall rubber | 0.15 | 0.15 | 0.15 | 0.15 | 0.15 | 0.15 | 0.15 |
| Mixing of bead apex rubber | Mixing example $C_1$ | Mixing example $C_1$ | Mixing example $C_1$ | Mixing example $C_1$ | Mixing example $C_1$ | Mixing example $C_1$ | Mixing example $C_1$ |
| Height of bead apex (%) | 40 | 40 | 40 | 40 | 40 | 35 | 35 |
| Loss tangent tan δ of bead apex rubber | 0.2 | 0.2 | 0.2 | 0.2 | 0.2 | 0.2 | 0.2 |
| Test result |  |  |  |  |  |  |  |
| Rolling resistance | 100 | 99 | 99 | 99.5 | 98 | 99 | 96 |
| Durability | ○ | X | ○ | ○ | ○ | ○ | ○ |

As can be understood from Table 1, for the comparison tire 1, since elongation to break Eb of belt end part interlayer rubber was the same as that for the conventional tire 1 and storage elastic modulus E' of belt coating rubber was higher, durability was worse although rolling resistance was reduced more compared with the conventional tire 1. On the other hand, for the tire 1 of the present invention, since elongation to break Eb of belt end part interlayer rubber was large and storage elastic modulus E' of belt coating rubber was high, rolling resistance was reduced without any reductions in durability.

For the comparison tire 2, since storage elastic modulus E' of side wall rubber was lower, rolling resistance was reduced more compared with the conventional tire 1. On the other hand, for the tire 2 of the present invention, storage elastic modulus E' of belt coating rubber was high, elongation to break Eb of belt end part interlayer rubber was large and storage elastic modulus E' of side wall rubber was low. Accordingly, rolling resistance was reduced more than expected in the case where only storage elastic modulus E' of belt coating rubber was high (comparison tire 1) and in the case where only storage elastic modulus E' of side wall rubber was low (comparison tire 2).

For the comparison tire 3, since a bead apex height was higher, rolling resistance was reduced more compared with the conventional tire 1. On the other hand, for the tire 3 of the present invention, storage elastic modulus E' of belt coating rubber was high, elongation to break Eb of belt end part interlayer rubber was large, storage elastic modulus E' of side wall rubber was low and a bead apex height was low. Accordingly, rolling resistance was reduced more than expected in the case where only storage elastic modulus E' of belt coating rubber was high (comparison tire 1), in the case where only storage elastic modulus E' of side wall rubber was low (comparison tire 2) and in the case where only a bead apex height was low (comparison tire 3).

trained test drivers, and running feelings were evaluated. Results of evaluation were graded by 5 points in comparison with the conventional example based on the criteria described below. The results are indicated by average points among the three drivers excluding highest and lowest points. As a point of evaluation is larger, handling stability is better. The criteria are as follows; 5: Very Excellent, 4: Excellent, 3.5: Slightly excellent, 3: Equal to standard, 2.5: Slightly inferior (practical lower limit), 2: Inferior, and 1: Greatly inferior.

TABLE 2

|  | Conventional tire 11 | Comparison tire 11 | Comparison tire 12 | Tire 11 of the invention | Tire 12 of the invention | Comparison tire 13 | Tire 13 of the invention | Tire 14 of the invention | Tire 15 of the invention |
|---|---|---|---|---|---|---|---|---|---|
| Bead apex |  |  |  |  |  |  |  |  |  |
| Arrangement of low tan δ rubber | None | None | FIG. 2 | FIG. 2 | FIG. 2 | FIG. 2 | FIG. 2 | FIG. 2 | FIG. 2 |
| Area set to below tan δ (%) | 0 | 0 | 25 | 30 | 70 | 30 | 70 | 70 | 70 |
| Mixing of base bead apex rubber | Mixing example $C_1$ | Mixing example $C_2$ | Mixing example $C_1$ | Mixing example $C_1$ | Mixing example $C_1$ | Mixing example $C_1$ | Mixing example $C_4$ | Mixing example $C_1$ | Mixing example $C_1$ |
| Tan δ of base bead apex rubber (%) | 100 (0.2) | 75 (0.15) | 100 (0.2) | 100 (0.2) | 100 (0.2) | 100 (0.2) | 110 (0.22) | 100 (0.2) | 100 (0.2) |
| Mixing of low tan δ rubber | — | — | Mixing example $C_2$ | Mixing example $C_2$ | Mixing example $C_2$ | Mixing example $C_3$ | Mixing example $C_2$ | Mixing example $C_2$ | Mixing example $C_2$ |
| Tan δ of low tan δ rubber (%) | — | — | 75 (0.15) | 75 (0.15) | 75 (0.15) | 80 (0.16) | 75 (0.15) | 75 (0.15) | 75 (0.15) |
| Height of turned-up edge of carcass layer (%) | 30 | 30 | 30 | 30 | 30 | 30 | 30 | 15 | 45 |
| Test result |  |  |  |  |  |  |  |  |  |
| Rolling resistance | 100 | 97 | 100 | 99 | 98 | 100 | 100 | 97.5 | 98 |
| Handling stability | 3.0 | 2.7 | 3.0 | 3.0 | 3.0 | 3.0 | 3.2 | 3.0 | 3.0 |
| Durability | ○ | ○ | ○ | ○ | ○ | ○ | ○ | ◎ | ◎ |

EXAMPLE 2

We manufactured a conventional tire 11, comparison tires 11 to 13 and tires 11 to 15 of the present invention. A tire size was 185/65R14 for each, and a tire structure shown in FIG. 2 was employed for each. But arrangements of low tan δ rubber in bead apexes, areas set to low tan δ, tan δ of base bead apex rubber, tan δ of low tan δ rubber and heights of turned-up edges of carcass layers were different among the tires. An area set to be low tan δ is a ratio (%) with respect to a section area of a bead apex positioned in a range of 20 to 35% of a tire section height SH. A tire section height SH is 121 mm; a bead apex height is 43% of the tire section height SH; a total section area of a bead apex is 180 mm²; and a section area of the bead apex positioned in the range of 20 to 35% of the tire section height SH is 84 mm². Tan δ of base bead apex rubber or low tan δ rubber is a ratio (%) with respect to tan δ of base bead apex rubber in the conventional tire 11, and real numerical values are shown in brackets. A height of a turned-up edge of a carcass layer is a ratio with respect to the tire section height SH.

For each of these tires, we evaluated rolling resistance and durability by using the foregoing testing method. We also evaluated handling stability by a testing method described below. Results of evaluation are shown in Table 2.

Handling Stability

Each test tire was fixed to a wheel having a rim size of 14×5-½JJ, and loaded in an FF passenger car having displacement of 1.6 liter by setting an air pressure to be 200 kPa. Then, the passenger car was run on a test course by 5

As can be understood from Table 2, for the comparison tire 11, since bead apex rubber for a single bead apex was set to be low tan δ, rolling resistance was reduced, but handling stability was also reduced. For the comparison tire 12, since an area set to be low tan δ was 25%, an effect of reducing rolling resistance was insufficient. On the other hand, for the tires 11 and 12 of the present invention, since areas set to be low tan δ were respectively 30% and 70%, rolling resistance was reduced while handling stability was maintained. For the comparison tire 13, since tan δ of low tan δ rubber was 80% of tan δ of base bead apex rubber, an effect of reducing rolling resistance was insufficient.

For the tire 13 of the present invention, since tan δ of base bead apex rubber was high, handling stability was improved while rolling resistance was maintained. For the tires 14 and 15 of the present invention, since heights of turned-up edges of carcass layers were respectively 15% and 45% of tire section heights SH, durability was improved while rolling resistance was reduced.

Mixing examples of rubber compositions used in each of the foregoing tests are shown below. Table 3 shows mixing examples $A_1$ to $A_3$ of belt rubber compositions. Table 4 shows mixing examples $B_1$ to $B_2$ of side wall rubber compositions. Table 5 shows mixing examples $C_1$ to $C_4$ of bead apex rubber compositions.

TABLE 3

| (Belt rubber composition) | Mixing example $A_1$ | Mixing example $A_2$ | Mixing example $A_3$ |
| --- | --- | --- | --- |
| NR #1 | 100.0 | 100.0 | 100.0 |
| Carbon black #1 | 60.0 | 65.0 | 60.0 |
| Zinc oxide | 10.0 | 10.0 | 10.0 |
| Antioxidant | 2.0 | 2.0 | 2.0 |
| Naphthenic acid cobalt | 1.0 | 1.0 | 1.0 |
| Steering acid cobalt | 1.0 | 1.0 | 1.0 |
| Sulfur #1 | 7.0 | 6.0 | 6.0 |
| Vulcanization accelerator #1 | 0.5 | 0.5 | 0.5 |

TABLE 4

| (Side wall rubber composition) | Mixing example $B_1$ | Mixing example $B_2$ |
| --- | --- | --- |
| NR #2 | 40.0 | 40.0 |
| cis BR | 60.0 | 60.0 |
| Carbon black #2 | 55.0 | 50.0 |
| Zinc oxide | 3.0 | 3.0 |
| Steering acid | 2.0 | 2.0 |
| Antioxidant | 5.0 | 5.0 |
| Wax | 2.0 | 2.0 |
| Aroma oil | 12.0 | 10.0 |
| Sulfur #2 | 1.5 | 1.5 |
| Vulcanization accelerator #2 | 1.0 | 1.0 |

TABLE 5

| (Filler rubber composition) | Mixing example $C_1$ | Mixing example $C_2$ | Mixing example $C_3$ | Mixing example $C_4$ |
| --- | --- | --- | --- | --- |
| NR #3 | 70.0 | 70.0 | 70.0 | 70.0 |
| SBR | 30.0 | 30.0 | 30.0 | 30.0 |
| Carbon black #2 | 50.0 | 45.0 | 50.0 | 50.0 |
| Carbon black #3 | 5.0 | — | — | 10.0 |
| Zinc oxide | 8.0 | 8.0 | 8.0 | 8.0 |
| Steering acid | 3.0 | 3.0 | 3.0 | 3.0 |
| Antioxidant | 3.0 | 3.0 | 3.0 | 3.0 |
| Resin #1 | 15.0 | 15.0 | 15.0 | 15.0 |
| Aroma oil | 5.0 | 5.0 | 5.0 | 5.0 |
| Resin #2 | 2.0 | 2.0 | 2.0 | 2.0 |
| Sulfur #1 | 5.0 | 5.0 | 5.0 | 5.0 |
| Vulcanization accelerator #3 | 2.0 | 2.0 | 2.0 | 2.0 |
| Vulcanization accelerator #4 | 1.5 | 1.5 | 1.5 | 1.5 |

In Tables 3 to 5,

NR#1: SMR-20
NR#2: STR-20
NR#3: SIR-20
cis BR: Nippol BR1220, made by Nippon Zeon
SBR: Nippol 1502, made by Nippon Zeon
Carbon black #1: HAF class carbon black, sheathed 300, made by Tokai Carbon
Carbon black #2: GPF class carbon black, diamond black G, made by Mitsubishi Chemical
Carbon black #3: HAF class carbon black N339, sheathed KH, made by Tokai Carbon
Zinc Oxide: Zinc white No. 3, made by Seido Chemical
Steering acid: Steering acid, made by Nippon Grease
Antioxidant: N-1,3-dimethylbutyl-N'-phenyl-p-phenylenediamine
Wax: Paraffin wax, made by Nippon Seiro
Aroma oil: Desolex No. 3, made by Showa Shell Oil
Naphthenic acid cobalt: 10% naphthenic acid cobalt, made by Dai Nippon Ink Industry
Steering acid cobalt: steering acid cobalt, made by Dai Nippon Ink Industry
Resin #1: Cashew oil, phenol, formaldehyde resin, made by Sumitomo Decores
Resin #2: Phenol.formaldehyde resin, phythanol 1502Z, made by Hitachi Kasei
Sulfur #1: 20% oil extended insoluble sulfur
Sulfur #2: 5% powder sulfur
Vulcanization accelerator #1: N, N-dicyclohexyl-2-benzothiazolyl sulfenic amide
Vulcanization accelerator #2: N, N-cyclohexyl-2-benzothiazolyl sulfenic amide
Vulcanization accelerator #3: N-ter-butyl-2-benzothiazolyl sulfenic amide
Vulcanization accelerator #4: Hexamethylenetetramine Although the preferred embodiment of the present invention has been described in detail, it should be understood that various changes, substitutions and alternations can be made therein without departing from spirit and scope of the inventions defined by the appended claims.

What is claimed is:

1. A pneumatic tire comprising:
   a carcass layer provided between a pair of left and right bead sections;
   left and right side wall sections interpolated for connecting said pair of left and right bead sections with a tread section to be continuous; and
   at least two belt layers provided in an outer peripheral side of said carcass layer in said tread section, each of said belt layers being composed of a plurality of reinforcing cords coated with coating rubber,
   wherein storage elastic modulus E' of said coating rubber is set in a range of 15.0 to 40.0 MPa, its loss tangent tan δ is set in a range of 0.1 to 0.25, interlayer rubber is provided between end parts of said belt layers, said interlayer rubber being specifically set in each of both end parts thereof in a tire width direction, and elongation to break Eb of said interlayer rubber is set in a range of 400 to 700%, storage modulus E' and loss tangent tan δ being measured at a frequency of 20 Hz, an initial strain of 10%, a dynamic strain of ±2%, and a temperature of 60° C.

2. A pneumatic tire according to claim 1, wherein storage elastic modulus E' of side wall rubber for each of said side wall sections is set in a range of 2.0 to 3.0 MPa.

3. A pneumatic tire according to claim 2, wherein a loss tangent tan δ of said side wall rubber is set in a range of 0.07 to 0.15.

4. A pneumatic tire according to claim 1, wherein a height of a bead apex arranged in each of said bead sections is set in a range of 10 to 35% of a tire section height SH.

5. A pneumatic tire according to claim 4, wherein a loss tangent tan δ of bead apex rubber for said bead apex is set in a range of 0.1 to 0.2.

6. A pneumatic tire comprising:
   a carcass layer provided between a pair of left and right bead sections, each of both end parts of said carcass layer in a tire width direction being turned up around a bead core from the inside of the tire to its outside;
   a bead apex arranged in an outer peripheral side of said bead core; and
   at least two belt layers provided in an outer peripheral side of said carcass layer in a tread section, each of said belt layers being composed of a plurality of reinforcing cords coated with coating rubber, wherein storage elastic modulus E' of said coating rubber is set in a range of 15.0 to 40.0 MPa, its loss tangent tan δ is set in a range of 0.1 to 0.25, interlayer rubber is provided between end parts of said belt layers, said interlayer rubber being specifically set in each of both end parts thereof in said tire width direction, elongation to break Eb of said interlayer rubber is set in a range of 400 to 700%, and at least a 30% area of a cross-sectional area of said bead apex positioned in a range of 20 to 35% of a tire section height SH is made of low tan δ rubber which is set in a range of 25 to 75% of tan δ of base bead apex rubber for a bead apex main body, storage modulus E' and loss tangent tan δ being measured at a frequency of 20 Hz, an initial strain of 10%, a dynamic strain of ±2%, and a temperature of 60° C.

* * * * *